(12) United States Patent
Kono et al.

(10) Patent No.: US 9,317,117 B2
(45) Date of Patent: Apr. 19, 2016

(54) TACTILE SENSATION PROVIDING APPARATUS AND CONTROL METHOD FOR TACTILE SENSATION PROVIDING APPARATUS

(75) Inventors: Kenji Kono, Yokohama (JP); Takashi Miyake, Sagamihara (JP); Takayuki Shinozaki, Yokohama (JP); Megumi Kuwabara, Yokohama (JP); Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 48 days.

(21) Appl. No.: 13/812,420

(22) PCT Filed: Jul. 5, 2011

(86) PCT No.: PCT/JP2011/003843
§ 371 (c)(1),
(2), (4) Date: Feb. 12, 2013

(87) PCT Pub. No.: WO2012/014387
PCT Pub. Date: Feb. 2, 2012

(65) Prior Publication Data
US 2013/0201138 A1 Aug. 8, 2013

(30) Foreign Application Priority Data
Jul. 27, 2010 (JP) ................................. 2010-168582

(51) Int. Cl.
*G06F 3/0487* (2013.01)
*G06F 3/01* (2006.01)
(Continued)

(52) U.S. Cl.
CPC ............ *G06F 3/016* (2013.01); *G06F 3/03547* (2013.01); *G06F 3/041* (2013.01); *G06F 2203/04105* (2013.01)

(58) Field of Classification Search
CPC ...... G06F 3/0414; G06F 3/016; G06F 3/0487
USPC ..................... 345/173, 168; 310/314; 701/532
See application file for complete search history.

(56) References Cited

U.S. PATENT DOCUMENTS

| 2008/0122315 A1* | 5/2008 | Maruyama et al. ........... 310/314 |
| 2008/0189032 A1 | 8/2008 | Beadman |

(Continued)

FOREIGN PATENT DOCUMENTS

| CN | 101458562 A | 6/2009 |
| JP | H10-293644 A | 11/1998 |

(Continued)

OTHER PUBLICATIONS

An Office Action; "Notice of Reason for Rejection," issued by the Japanese Patent Office on Apr. 1, 2014, which corresponds to Japanese Patent Application No. 2010-168582 and is related to U.S. Appl. No. 13/812,420; with English language concise explanation.

(Continued)

Primary Examiner — Dwayne Bost
Assistant Examiner — Sepehr Azari
(74) Attorney, Agent, or Firm — Studebaker & Brackett PC (57) ABSTRACT

Dual chips exchange a signal indicating a pressing load detected for providing the tactile sensation such that application processing based on the load is performed. A tactile sensation providing apparatus includes a touch sensor, a load detection unit for detecting the load on the sensor for providing the tactile sensation, a tactile sensation providing unit for vibrating a touch face of the sensor, a tactile sensation provision control unit for controlling drive of the providing unit, and a main control unit for controlling performing an operation corresponding to the load. The main control unit transmits, to the provision control unit, a load detection instruction in activation of the application and a load stop instruction in closing the application. The provision control unit starts detecting the load upon receiving the detection instruction and stops detecting the load upon receiving the stop instruction.

2 Claims, 5 Drawing Sheets

(51) Int. Cl.
*G06F 3/041* (2006.01)
*G06F 3/0354* (2013.01)

(56) References Cited

U.S. PATENT DOCUMENTS

| | | |
|---|---|---|
| 2008/0216578 A1 | 9/2008 | Takashima et al. |
| 2009/0153489 A1 | 6/2009 | Murakami et al. |
| 2011/0053641 A1 | 3/2011 | Lee et al. |
| 2011/0181539 A1 | 7/2011 | Aono |

FOREIGN PATENT DOCUMENTS

| | | |
|---|---|---|
| JP | 2006-106819 A | 4/2006 |
| JP | 2007-323410 A | 12/2007 |
| JP | 2008-197093 A | 8/2008 |
| JP | 2008-225690 A | 9/2008 |
| JP | 2009-146212 A | 7/2009 |
| JP | 2009-276992 A | 11/2009 |
| JP | 2010-086076 A | 4/2010 |
| JP | 2010-152736 A | 7/2010 |
| KR | 2010-0052378 A | 5/2010 |
| WO | 2010/073731 A1 | 7/2010 |

OTHER PUBLICATIONS

An Office Action issued by the Korean Patent Office on Jan. 23, 2014, which corresponds to Korean Patent Application No. 10-2013-7003627 and is related to U.S. Appl. No. 13/812,420; with English language concise explanation.

International Search Report; PCT/JP2011/003843; Aug. 16, 2011.

An Office Action; "Decision of Rejection," issued by the Japanese Patent Office on Oct. 28, 2014, which corresponds to Japanese Patent Application No. 2010-168582 and is related to U.S. Appl. No. 13/812,420; with English language concise explanation.

"Notification of the First Office Action," issued by the Chinese Patent Office on Mar. 3, 2015, which corresponds to Chinese Patent Application No. 201180037011.1 and is related to U.S. Appl. No. 13/812,420; with English language translation.

* cited by examiner

TACTILE SENSATION PROVIDING APPARATUS AND CONTROL METHOD FOR TACTILE SENSATION PROVIDING APPARATUS

CROSS REFERENCE TO RELATED APPLICATION

This application claims priority to and the benefit of Japanese Patent Application No. 2010-168582 (filed on Jul. 27, 2010), the entire contents of which are incorporated herein by reference.

TECHNICAL FIELD

The present invention relates to a tactile sensation providing apparatus having a touch sensor and a control method for the tactile sensation providing apparatus.

BACKGROUND ART

In recent years, input apparatuses having touch sensors such as touch panels, touch switches or the like are popularly used as input apparatuses such as operation units for receiving input operations by operators in mobile devices such as mobile phones and gaming machines, information equipments such as calculator and ticket vending machines, home electric appliances such as microwaves, TV sets and lighting equipments, industrial equipments (FA equipments) and the like.

There are known a variety of types of the touch sensors, such as a resistive film type, a capacitive type, an optical type and the like. However, the touch sensors of these types receive a touch input (input operation) by a pressing means (an object) such as a finger or a stylus pen and, unlike push-button switches, the touch sensors themselves are not physically displaced when being touched.

As such, there is suggested an input apparatus that, for example, vibrates the touch sensor when the input apparatus detects an input applying a predetermined pressing load or greater to a predetermined area of the touch sensor, such that a tactile sensation is provided at operator's fingertip as feedback (for example, see Patent Document 1).

RELATED ART DOCUMENT

Patent Document

Patent Document 1: Japanese Patent Laid-Open No. 10-293644

SUMMARY OF INVENTION

Technical Problem

A function to provide the tactile sensation by vibrating the touch sensor may be implemented by a chip such as a dedicated processor, a piezoelectric element and the like. For example, by combining a touch sensor apparatus having no function to provide the tactile sensation with a chip having the function to provide the tactile sensation, the function to provide the tactile sensation is introduced to a variety of touch sensor apparatuses and enables the touch sensor apparatuses to function as the tactile sensation providing apparatus. In this case, the tactile sensation providing apparatus includes dual chips: an entire apparatus control chip for controlling an application, the touch sensor and the like; and a tactile sensation providing chip for controlling provision of the tactile sensation. However, no prior art has considered about the tactile sensation providing apparatus having the dual chips.

A conventional touch sensor detects position information of the touch input but not a pressing load of the touch input. On the other hand, the tactile sensation providing chip, controlling provision of the tactile sensation when there is a pressing load equal to or greater than a predetermined value, detects the pressing load of the touch input by using, for example, the piezoelectric element. Accordingly, the entire apparatus control chip for controlling the application and the like, in order to control application processing based on the pressing load, needs to obtain the pressing load from the tactile sensation providing chip. For example, when there is the touch input applying the predetermined pressing load or greater to a predetermined area (pressing load corresponding area) of the user interface of the application, such as a press button and an icon, for performing an operation corresponding to the pressing load, appropriate application processing is expected to be performed in response to the touch input. However, the pressing load detected by the tactile sensation providing chip serves as information detected for control provision of the tactile sensation and not considered to be used for the application processing by another chip.

Accordingly, an object of the present invention in consideration of such a condition is to provide a tactile sensation providing apparatus capable of performing the application processing based on the pressing load by exchanging a signal indicating the pressing load detected for providing the tactile sensation between the dual chips.

Solution to Problem

In order to achieve the above object, a tactile sensation providing apparatus according to a first aspect of the present invention includes:
 a touch sensor;
 a load detection unit configured to detect a pressing load on the touch sensor for providing a tactile sensation;
 a tactile sensation providing unit configured to vibrate a touch face of the touch sensor;
 a tactile sensation provision control unit configured to control drive of the tactile sensation providing unit; and
 a main control unit configured to control an application for performing an operation corresponding to the pressing load, wherein
 the main control unit transmits, to the tactile sensation provision control unit, a pressing load detection instruction in activation of the application and a pressing load stop instruction in closing the application, and
 the tactile sensation provision control unit starts detecting the pressing load upon receiving the pressing load detection instruction from the main control unit and stops detecting the pressing load upon receiving the pressing load stop instruction from the main control unit.

Further, in order to achieve the above object, a control method for a tactile sensation providing apparatus according to a second aspect of the present invention, the tactile sensation providing apparatus including a touch sensor, a load detection unit configured to detect a pressing load on the touch sensor for providing a tactile sensation, a tactile sensation providing unit configured to vibrate a touch face of the touch sensor, a tactile sensation provision control unit configured to control drive of the tactile sensation providing unit, and a main control unit configured to control an application for performing an operation corresponding to the pressing load, includes steps for:

the main control unit transmitting a pressing load detection instruction to the tactile sensation provision control unit in activation of the application and a pressing load stop instruction in closing the application; and for the tactile sensation provision control unit starting detecting the pressing load upon receiving the pressing load detection instruction from the main control unit and stopping detecting the pressing load upon receiving the pressing load stop instruction from the main control unit.

Effect of the Invention

According to the present invention, since a signal indicating the pressing load detected for providing the tactile sensation is exchanged between dual chips, the application processing based on the pressing load may be performed.

DESCRIPTION OF EMBODIMENTS

Embodiments of the present invention will be described with reference to the accompanying drawings.

Figure 1:
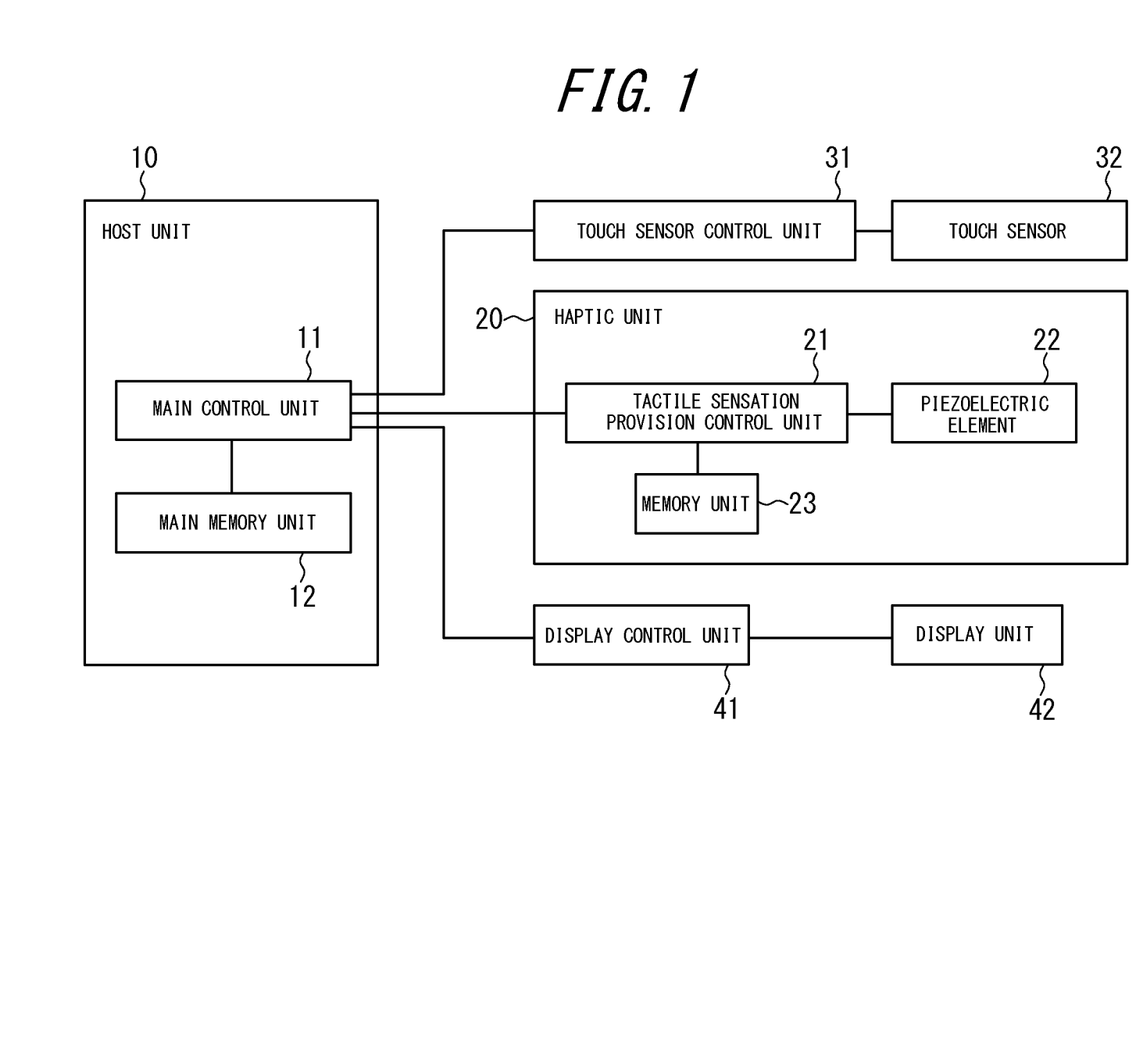
FIG. 1 is a functional block diagram illustrating a schematic configuration of a tactile sensation providing apparatus according to a first embodiment of the present invention.

FIG. 1 is a functional block diagram illustrating a schematic configuration of a tactile sensation providing apparatus according to a first embodiment of the present invention. The tactile sensation providing apparatus includes a host unit 10 for controlling overall operations of the tactile sensation providing apparatus, a haptic unit 20 for controlling provision of a tactile sensation, a touch sensor control unit 31, a touch sensor 32, a display control unit 41 and a display unit 42.

The host unit 10 includes a main control unit 11 and a main memory unit 12. The main control unit 11 is configured by using any appropriate processor such as CPU (Central Processing Unit) and controls overall operations of the tactile sensation providing apparatus such as application processing and a user interface. Here, an application includes software process of an operating system and middleware as well as an individual application. The main memory unit 12 stores an application program and a plurality of parameter tables for providing the tactile sensation. The parameter table will be described in detail below.

The haptic unit 20 includes a tactile sensation provision control unit 21, a piezoelectric element 22 and a memory unit 23. The tactile sensation provision control unit 21 is configured by using a dedicated processor (for example, DSP (Digital Signal Processor)). The piezoelectric element 22 of the haptic unit 20 serves as a tactile sensation providing unit for vibrating a touch face 32a of the touch sensor and also as a load detection unit for detecting a pressing load on the touch sensor 32. The pressing load detected by the piezoelectric element 22 is supplied to the tactile sensation provision control unit 21. The tactile sensation provision control unit 21, based on the pressing load detected by the piezoelectric element 22, controls drive of the piezoelectric element 22. The memory unit 23 stores a plurality of parameter tables for providing the tactile sensation. Here, the parameter tables stored in the memory unit 23 are also stored in the main memory unit 12 of the host unit 10. That is, the host unit 10 and the haptic unit 20 store common parameter tables for providing the tactile sensation.

The parameter table for providing the tactile sensation includes various parameters such as the number of pressing steps, the number of releasing steps, a pressing threshold, a releasing threshold, a pressing vibration pattern, a releasing vibration pattern, vibration intensity and a calibration parameter. As the number of pressing steps, the number of steps (times) to provide a tactile sensation (pressing sensation) to an object such as a finger or the like while the object is pressing the touch sensor 32 are set. As the number of releasing steps, the number of steps to provide a tactile sensation (releasing sensation) to the object while the object is releasing the touch sensor 32 are set. As the pressing threshold and the releasing threshold, a load threshold at the pressing step and that at the releasing step are respectively set. As the pressing vibration pattern and the releasing vibration pattern, a pattern of a drive signal to be provided to the piezoelectric element 22 for providing the pressing sensation and the release sensation are respectively set. Based on the pressing vibration pattern and the releasing vibration pattern, a click sensation, a pressing sensation and the like obtained when pressing a push-button switch are provided. As the vibration intensity, vibration intensity of each of the pressing vibration pattern and the releasing vibration pattern is set. As the calibration parameter, the vibration intensity and input sensitivity for each tactile sensation providing area are set.

Figure 2:
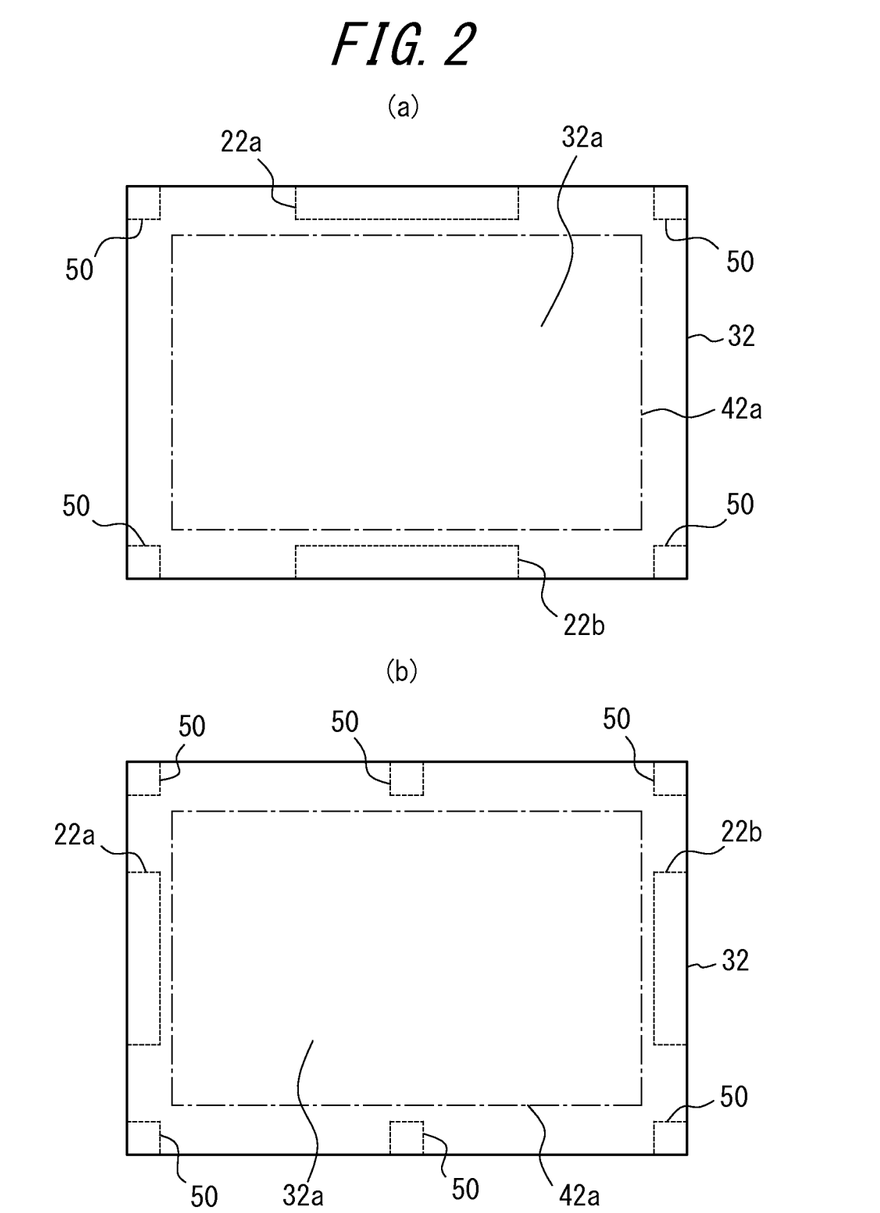
FIG. 2(a) and FIG. 2(b) are plane views illustrating two examples of a schematic configuration of a supporting structure of a touch sensor illustrated in FIG. 1.

The touch sensor 32 receives a touch input to the display unit 42 by a pressing means (the object) such as the finger and the like and is configured by using, for example, a touch panel, a touch switch or the like of a known type such as a resistive film type, a capacitive type, an optical type and the like. Input position information of the object on a touch face 32a (see FIG. 2) of the touch sensor 32 is detected by the touch sensor control unit 31 based on an output of the touch sensor 32. The touch sensor 31 and the main control unit 11 of the host unit 10 are connected to each other such that, when there is the touch input to the touch sensor 32, the touch sensor control unit 31 supplies the input position information of the touch input to the main control unit 11 of the host unit 10.

The display unit 42 is controlled by the main control unit 11 via the display control unit 41. Thereby, the display unit 42 displays the user interface based on the application. The display unit 42 displays, in the user interface, a pressing load corresponding area such as, for example, the push-button switch (push type button switch) and the like. The display unit 42 is configured by using, for example, a liquid crystal display panel, an organic EL display panel and the like.

FIG. 2(a) and FIG. 2(b) are plane views illustrating two examples of a schematic configuration of a supporting structure of the touch sensor 32 illustrated in FIG. 1. In the supporting structure illustrated in FIG. 2(a), the touch sensor 32 is rectangular in shape in a planar view and bendably supported on the display unit 42 (see FIG. 1) via support members 50 at four corners on a rear side of the touch sensor 32. On the rear side of the touch sensor 32 outside a display area 42a of the display unit 42 indicated by dashed lines in the figure, piezoelectric elements 22a, 22b in the shape of a strip are adhered along each of two long sides at a center thereof. The piezoelectric elements 22a, 22b construct the piezoelectric element 22 in FIG. 1.

Accordingly, the touch sensor 32 slightly bends when the touch face 32a is pressed. As the touch sensor 32 bends, electric charge is accumulated in the piezoelectric elements 22a, 22b and a voltage is generated. Also, when the voltage is externally applied to the piezoelectric elements 22a, 22b, the piezoelectric elements 22a, 22b bend and the touch sensor 32 vibrates bending while being supported by the support members 50 at the four points.

In the supporting structure illustrated in FIG. 2(b), the touch sensor 32 is rectangular in shape in the planar view and bendably supported on the display unit 42 (see FIG. 1) via the support members 50 at six points on the rear side of the touch sensor 32: four corners and each center point of the two long sides. Also, on the rear side of the touch sensor 32 outside the display area 42a of the display unit 42, the piezoelectric elements 22a, 22b in the shape of a strip construct the piezoelectric element 22 in FIG. 1 and are adhered along each of two short sides at a center thereof.

Accordingly, in a similar manner to a case in FIG. 2(a), the touch sensor 32 slightly bends when the touch face 32a is pressed. When the touch sensor 32 bends, electricity is charged to the piezoelectric elements 22a, 22b and the voltage is generated. Also, when the voltage is externally applied to the piezoelectric elements 22a, 22b, the piezoelectric elements 22a, 22b bend and the touch sensor 32 vibrates bending while being supported by the support members 50 at the six points.

Figure 3:
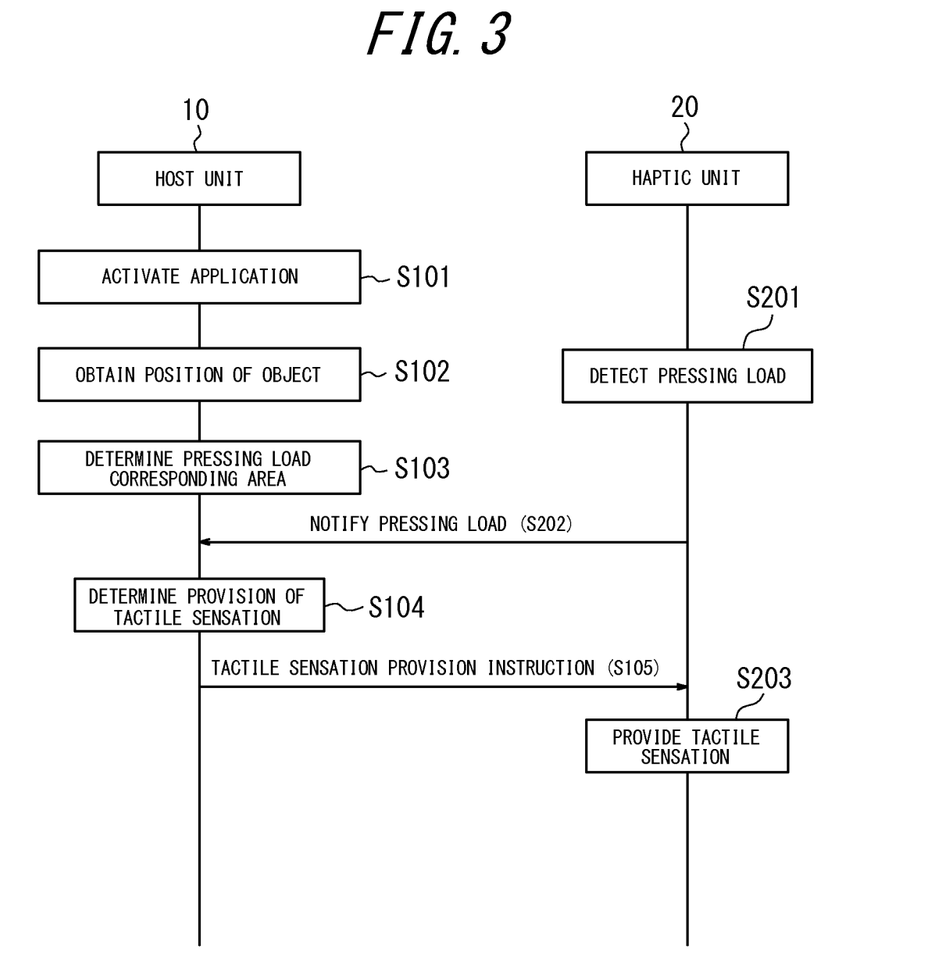
FIG. 3 is a sequence diagram illustrating an example of operations of a host unit and a haptic unit of the tactile sensation providing apparatus illustrated in FIG. 1.

The following is a description of examples of operations of the host unit 10 and the haptic unit 20 of the tactile sensation providing apparatus illustrated in FIG. 1. FIG. 3 is a sequence diagram illustrating an example of operations of the host unit 10 and the haptic unit 20 of the tactile sensation providing apparatus illustrated in FIG. 1.

When the main control unit 11 of the host unit 10 activates the application, the display unit 42 displays a user interface including the pressing load corresponding area such as a push button and the like (step S101). When the object such as the finger or the like inputs to the touch sensor 32 supported on the display unit 42, the main control unit 11 detects a position of the object by obtaining the input position information from the touch sensor control unit 31 (step S102). Then, the main control unit 11, based on a result of detection of the position of the object, determines whether the object is inputting to a predetermined area (the pressing load corresponding area of the user interface) of the touch face 32a (step S103).

In the haptic unit 20, the tactile sensation provision control unit 21 detects the pressing load on the touch sensor 32 by periodically obtaining an output voltage of the piezoelectric element 22 (step S201). The pressing load detected by the tactile sensation provision control unit 21 serves as information detected for providing the tactile sensation. The tactile sensation provision control unit 21 according to the present embodiment, however, notifies the main control unit 11 of the host unit 10 of the pressing load periodically obtained (step S202). Accordingly, the main control unit may perform the application processing based on the pressing load.

According to the present embodiment, the main control unit 11 provides a tactile sensation corresponding to the application based on the pressing load received from the tactile sensation provision control unit 21. Hereinafter, among the pressing load corresponding areas of the user interface, an area for providing a tactile sensation in response to an input is referred to as the tactile sensation providing area. When the object is inputting to the pressing load corresponding area (tactile sensation providing area) of the touch face 32a, the main control unit 11 of the host unit 10 determines whether the pressing load notified by the tactile sensation provision control unit 21 satisfies the pressing threshold (a standard for providing the tactile sensation) set in the parameter corresponding to the tactile sensation providing area (step S104). When the pressing load satisfies the pressing threshold, the main control unit 11 transmits a tactile sensation provision instruction to the tactile sensation provision control unit 21 of the haptic unit 20 (step S105). The tactile sensation provision instruction includes a number specifying the parameter table corresponding to the tactile sensation providing area. The main control unit 11, by changing the parameter table for providing the tactile sensation based on the application and the tactile sensation providing area, may control the haptic unit 20 such that a predetermined tactile sensation is provided.

The tactile sensation provision control unit 21 of the haptic unit 20, upon receiving the tactile sensation provision instruction from the main control unit 11, outputs the pressing vibration pattern set in the parameter table specified by the tactile sensation provision instruction to the piezoelectric element 22 such that the tactile sensation is provided to the object (step S203).

According to the present embodiment, as described above, the tactile sensation provision control unit 21 transmits the pressing load detected for providing the tactile sensation to the main control unit 11, and the main control unit 11, based on the output of the touch sensor 32 and the pressing load received from the tactile sensation provision control unit 21, performs the application processing. Accordingly, since the host unit 10 and the haptic unit 20 composing the dual chips exchange the signal indicating the pressing load detected for providing the tactile sensation therebetween, the application processing based on the pressing load may be performed. That is, the main control unit may change the user interface of the application based on the pressing load and perform an operation associated with the pressing load corresponding area.

According to the present embodiment, further, the main control unit 11, when the tactile sensation providing area is touched and the pressing load received from the tactile sensation provision control unit 21 satisfies the standard for providing the tactile sensation, controls the tactile sensation provision control unit 21 to provide the tactile sensation. Accordingly, since the host unit 10 and the haptic unit 20 composing the dual chips exchange the signal indicating the pressing load detected for providing the tactile sensation therebetween, a predetermined tactile sensation based on the application may be provided.

Figure 4:
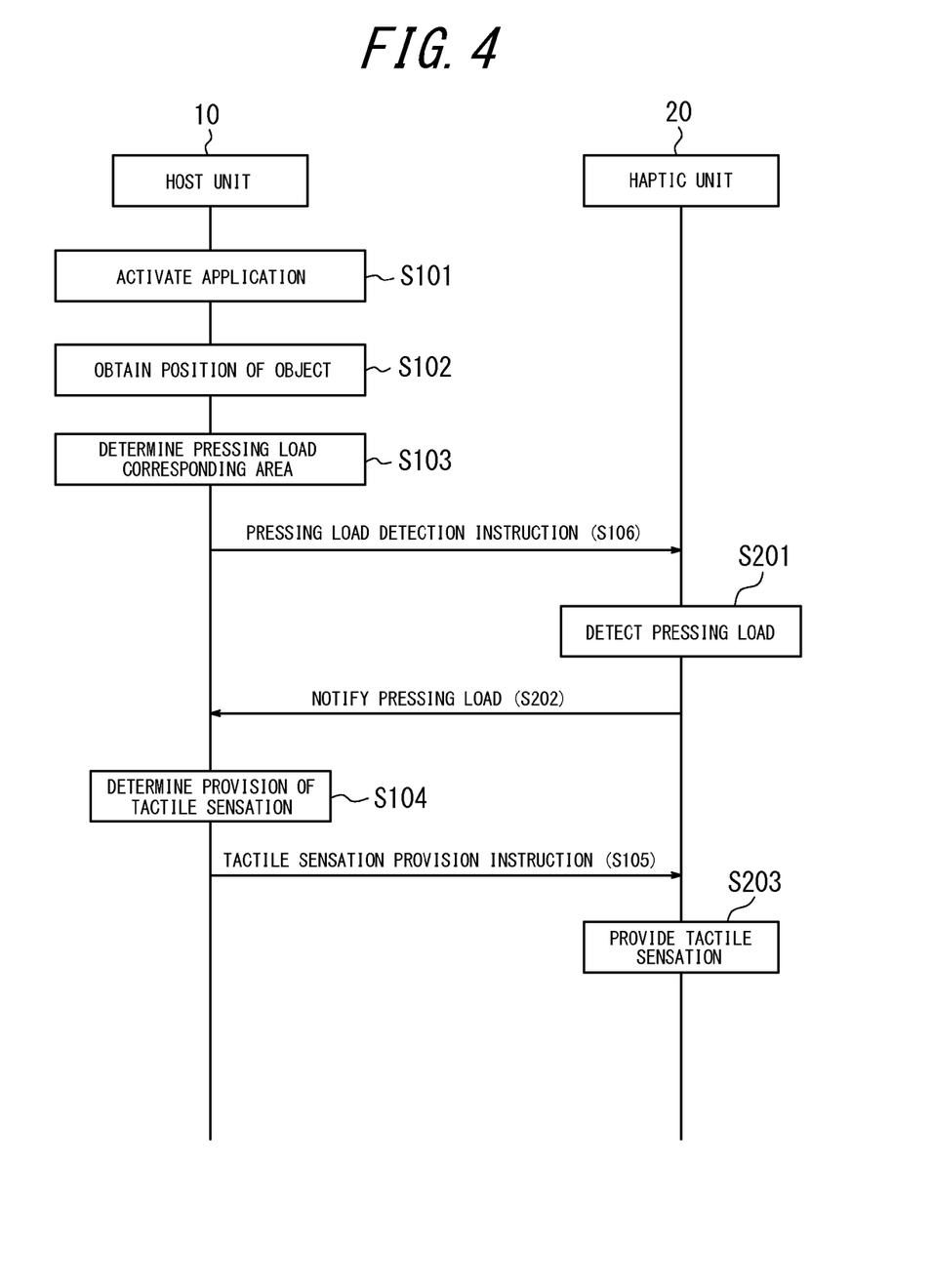
FIG. 4 is a sequence diagram illustrating an example of operations of the host unit and the haptic unit of the tactile sensation providing apparatus illustrated in FIG. 1.

FIG. 4 is a sequence diagram illustrating another example of operations of the host unit 10 and the haptic unit 20 of the tactile sensation providing apparatus illustrated in FIG. 1.

When the main control unit 11 of the host unit 10 activates the application, the display unit 42 displays the user interface including the pressing load corresponding area such as the push button and the like (step S101). When the object such as the finger or the like inputs to the touch sensor 32 supported on the display unit 42, the main control unit 11 detects a position of the object by obtaining the input position information from the touch sensor control unit 31 (step S102). Then, the main control unit 11, based on the result of detection of the position of the object, determines whether the object is inputting to the predetermined area (the pressing load corresponding area of the user interface) of the touch face 32a (step S103). When the object is inputting to the pressing load corresponding area, the main control unit 11 transmits a pressing load detection instruction to the tactile sensation provision control unit 21 of the haptic unit 20 (step S106).

Upon receiving the pressing load detection instruction from the main control unit 11, the tactile sensation provision control unit 21 of the haptic unit 20 detects the pressing load on the touch sensor 32 by obtaining the output voltage of the piezoelectric element 22 (step S201). The pressing load detected by the tactile sensation provision control unit 21 serves as the information detected for controlling provision of the tactile sensation. The tactile sensation provision control unit 21 according to the present embodiment, however, notifies the main control unit 11 of the host unit 10 of the obtained pressing load (step S202). Accordingly, the main control unit 11 may perform the application processing in consideration of the pressing load.

According to the present embodiment, the main control unit 11 controls to provide the tactile sensation corresponding to the application based on the pressing load received from the tactile sensation provision control unit 21. When the object is inputting to the pressing load corresponding area (tactile sensation providing area) of the touch face 32a, the main control unit 11 of the host unit 10 determines whether the pressing load notified from the tactile sensation provision control unit 21 satisfies the pressing threshold (the standard for providing the tactile sensation) set in the parameter table corresponding to the tactile sensation providing area (step S104). When the pressing load satisfies the pressing threshold, the main control unit 11 transmits the tactile sensation provision instruction to the tactile sensation provision control unit 21 of the haptic unit 20 (step S105). The tactile sensation provision instruction includes a number specifying the parameter table corresponding to the tactile sensation providing area. The main control unit 11, by changing the parameter table for providing the tactile sensation based on the application and the tactile sensation providing area, may control the haptic unit 20 to provide a predetermined tactile sensation.

The tactile sensation provision control unit 21 of the haptic unit 20, upon receiving the tactile sensation provision instruction from the main control unit 11, outputs to the piezoelectric element 22 the pressing vibration pattern set in the parameter table specified by the tactile sensation provision instruction such that the tactile sensation is provided to the object (step S203).

According to the present embodiment, as described above, when the pressing load corresponding area is touched, the main control unit 11 transmits the pressing load detection instruction to the tactile sensation provision control unit 21. Upon receiving the pressing load detection instruction from the main control unit 11, the tactile sensation provision control unit 21 detects the pressing load and transmits the detected pressing load to the main control unit 11. The main control unit 11, based on the pressing load received from the tactile sensation provision control unit 21, performs the application process. Accordingly, since the host unit 10 and the haptic unit 20 composing the dual chips exchange the signal indicating the pressing load detected for providing the tactile sensation therebetween, the application processing based on the pressing load may be performed. That is, the main control unit 11 may change the user interface of the application based on the pressing load and perform operations associated with the pressing load corresponding area. Especially, since the tactile sensation provision control unit 21 detects the pressing load after receiving the pressing load detection instruction from the main control unit 11, unnecessary detection of the pressing load may be prevented, reducing a processing load and power consumption of overall tactile sensation providing apparatus.

According to the present embodiment, also, when the tactile sensation providing area is touched and the pressing load received from the tactile sensation provision control unit 21 satisfies the standard for providing the tactile sensation, the main control unit 11 controls the tactile sensation provision control unit 21 to provide the tactile sensation. Accordingly, the host unit 10 and the haptic unit 10 composing the dual chips exchange the signal indicating the pressing load detected for providing the tactile sensation therebetween, and thereby a predetermined tactile sensation corresponding to the application may be provided.

Figure 5:
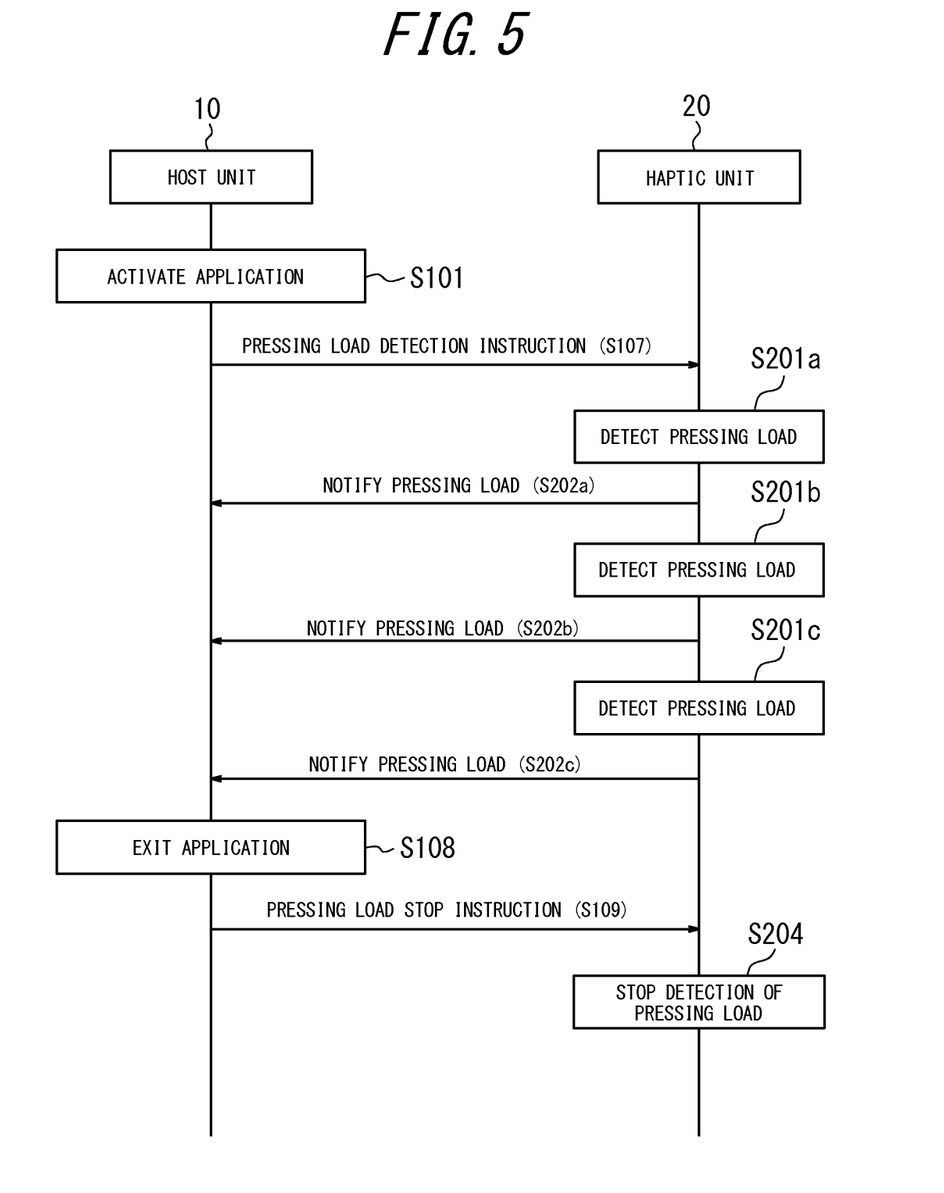
FIG. 5 is a sequence diagram illustrating an example of operations of the host unit and the haptic unit of the tactile sensation providing apparatus illustrated in FIG. 1.

FIG. 5 is a sequence diagram illustrating another example of operations of the host unit 10 and the haptic unit 20 of the tactile sensation providing apparatus illustrated in FIG. 1.

When the main control unit 11 of the host unit 10 activates an application for performing an operation corresponding to the pressing load, the display unit 42 displays the user interface including the pressing load corresponding area such as the push button and the like (step S101). Then, the main control unit 11 transmits the pressing load detection instruction to the tactile sensation provision control unit 21 (step S107).

Upon receiving the pressing load detection instruction from the main control unit 11, the tactile sensation provision control unit 21 of the haptic unit 20 starts detecting the pressing load. The tactile sensation provision control unit 21 detects the pressing load on the touch sensor 32 by periodically obtaining the output voltage of the piezoelectric element 22 (steps S201a-S201c). The pressing load detected by the tactile sensation provision control unit 21 serves as the information detected for controlling provision of the tactile sensation. The tactile sensation provision control unit 21 according to the present embodiment, however, notifies the main control unit 11 of the host unit 10 of the pressing load periodically obtained (steps S202a-S202c). Accordingly, the main control unit 11 may perform the application processing in consideration of the pressing load.

When the host unit 10 exits the application for performing the operation corresponding to the pressing load (step S108), the main control unit 11 transmits a pressing load stop instruction to the tactile sensation provision control unit 21 (step S109).

Upon receiving the pressing load stop instruction from the main control unit 11, the tactile sensation provision control unit 21 of the haptic unit 20 stops detecting the pressing load (step S204).

According to the present embodiment, as described above, the main control unit 11 transmits the pressing load detection instruction to the tactile sensation provision control unit 21 in activation of the application for performing the operation corresponding to the pressing load and transmits the pressing load stop instruction to the tactile sensation provision control unit 21 in exit out of the application. The tactile sensation provision control unit 21 starts detecting the pressing load when receiving the pressing load detection instruction from the main control unit 11 and stops detecting the pressing load when receiving the pressing load stop instruction from the main control unit 11. Accordingly, the host unit 10 and the haptic unit 20 composing the dual chips exchange the signal indicating the pressing load detected for providing the tactile sensation therebetween, and thereby the application processing based on the pressing load may be performed. That is, the main control unit 11 may change the user interface of the application based on the pressing load and perform operations associated with the pressing load corresponding area. Especially, since the tactile sensation provision control unit 21 detects the pressing load after receiving the pressing load detection instruction from the main control unit 11, unnecessary detection of the pressing load may be prevented, reducing the processing load and power consumption of the overall tactile sensation providing apparatus. Also, since the tactile sensation provision control unit 21 stops detecting the pressing load when the application for performing the operation corresponding to the pressing load is closed, the processing load and power consumption of the overall tactile sensation providing apparatus may be further reduced. Note that switchover between starting and stopping detection of the pressing load may be performed not only by activating or exiting out of the application but also by changing an operation state of the tactile sensation providing apparatus such as changing into and cancellation of a sleep mode.

It is to be understood that the present invention is not limited to the above embodiments but may be modified or varied in a multiple of manners. For example, it may be desired that the main control unit 11 controls the haptic unit 20 based on a parameter table for providing the tactile sensation that is not stored in the memory unit 23 of the haptic unit 20. In such a case, the main control unit 11 may transmit, for example, the tactile sensation instruction including the parameter table for providing the tactile sensation (S105). The tactile sensation provision control unit 21, upon receiving the parameter table, may drive the piezoelectric element 22 based on the received parameter table and store the received parameter table in the memory unit 23.

Also, although the piezoelectric element 22 serves as the tactile sensation providing unit and the load detection unit in the above embodiments, the tactile sensation providing unit and the load detection unit may be provided separately. In such a case, the tactile sensation providing unit may be configured by using, not limited to the piezoelectric element, but other known vibration means such as an eccentric motor, solenoid and the like. Also, the touch sensor may be supported via laminated piezoelectric elements. Similarly, the load detection unit may be configured by using, not limited to the piezoelectric element, but other known load detection means such as a strain gauge sensor and the like. Moreover, the load detection unit may be omitted. Further, the present invention is also applicable to a tactile sensation providing apparatus including no display unit but including a touch sensor having the pressing load corresponding area directly depicted thereon by printing or the like.

Further, the tactile sensation providing apparatus according to the present invention drives the piezoelectric element when the pressing load detected based on the output of the piezoelectric element satisfies the standard for providing the tactile sensation. Here, "when the pressing load detected based on the output of the piezoelectric element satisfies the standard for providing the tactile sensation" may be "when the detected pressing load reaches a standard value for providing the tactile sensation", "when the detected pressing load exceeds the standard value for providing the tactile sensation", or "when the standard value for providing the tactile sensation is detected based on the output of the piezoelectric element".

REFERENCE SIGNS LIST

10 host unit
11 main control unit
12 main memory unit
20 haptic unit
21 tactile sensation provision control unit
22 piezoelectric element
23 memory unit
31 touch sensor control unit
32 touch sensor
41 display control unit
42 display unit
50 support member

The invention claimed is:

1. A tactile sensation providing apparatus comprising:
   a touch sensor;
   a load detection unit configured to detect at least one pressing load on the touch sensor for providing a tactile sensation;
   a tactile sensation providing unit configured to vibrate a touch face of the touch sensor;
   a tactile sensation provision control unit configured to control drive of the tactile sensation providing unit; and
   a main control unit configured to control an application for performing an operation corresponding to the at least one pressing load in consideration of the at least one pressing load received from the tactile sensation provision control unit, wherein
   the main control unit transmits, to the tactile sensation provision control unit, a pressing load detection instruction in activation of the application and a pressing load stop instruction in closing the application, wherein the tactile sensation providing apparatus remains in an operational state after closing the application, and
   the tactile sensation provision control unit starts detecting the at least one pressing load and notifies the main control unit of the at least one pressing load upon receiving the pressing load detection instruction from the main control unit and stops detecting the at least one pressing load upon receiving the pressing load stop instruction from the main control unit.

2. A control method for a tactile sensation providing apparatus including a touch sensor,
   a load detection unit configured to detect at least one pressing load on the touch sensor for providing a tactile sensation,
   a tactile sensation providing unit configured to vibrate a touch face of the touch sensor;
   a tactile sensation provision control unit configured to control drive of the tactile sensation providing unit, and
   a main control unit configured to control an application for performing an operation corresponding to the at least one pressing load in consideration of the at least one pressing load received from the tactile sensation provision control unit, comprising steps for:
   the main control unit transmitting, to the tactile sensation provision control unit, a pressing load detection instruction in activation of the application and a pressing load stop instruction in closing the application, wherein the tactile sensation providing apparatus remains in an operational state after closing the application; and
   the tactile sensation provision control unit starting detecting the at least one pressing load and notifying the main control unit of the at least one pressing load upon receiving the pressing load detection instruction from the main control unit, and stopping detecting the at least one pressing load upon receiving the pressing load stop instruction from the main control unit.

* * * * *